(12) United States Patent
Mahieu et al.

(10) Patent No.: US 9,630,876 B2
(45) Date of Patent: Apr. 25, 2017

(54) LOW-EMISSIVITY AND ANTI-SOLAR GLAZING

(71) Applicant: AGC GLASS EUROPE, Louvain-la-Neuve (BE)

(72) Inventors: Stijn Mahieu, Lovendegem (BE); Anne-Christine Baudouin, Louvain-la-Neuve (BE); Marc Hauptmann, Kessel-Lo (BE); Jean-Michel Depauw, Brussels (BE); Michael Purwins, Offensen (DE); Eric Mathieu, Sarreguemines (FR); Hansjoerg Weis, Hoexter (DE)

(73) Assignee: AGC GLASS EUROPE, Louvain-la-Neuve (BE)

( * ) Notice: Subject to any disclaimer, the term of this patent is extended or adjusted under 35 U.S.C. 154(b) by 0 days.

(21) Appl. No.: 14/894,418

(22) PCT Filed: May 28, 2014

(86) PCT No.: PCT/EP2014/061113
§ 371 (c)(1),
(2) Date: Nov. 27, 2015

(87) PCT Pub. No.: WO2014/191484
PCT Pub. Date: Dec. 4, 2014

(65) Prior Publication Data
US 2016/0122236 A1    May 5, 2016

(30) Foreign Application Priority Data
May 30, 2013   (BE) .................................. 2013/0386

(51) Int. Cl.
  *B32B 15/04*   (2006.01)
  *B32B 17/06*   (2006.01)
  *C03C 17/36*   (2006.01)
(52) U.S. Cl.
  CPC ........ *C03C 17/366* (2013.01); *C03C 17/3618* (2013.01); *C03C 17/3626* (2013.01); *C03C 17/3639* (2013.01); *C03C 17/3642* (2013.01); *C03C 17/3644* (2013.01); *C03C 17/3681* (2013.01)
(58) Field of Classification Search
  USPC ....... 428/426, 428, 432, 433, 434, 688, 689, 428/697, 698, 699, 701, 702
  See application file for complete search history.

(56) References Cited

U.S. PATENT DOCUMENTS

| 5,942,338 | A  | * | 8/1999  | Arbab ..................... C03C 17/36 428/623 |
| 6,398,925 | B1 | * | 6/2002  | Arbab ..................... C03C 17/36 204/192.15 |
| 6,833,194 | B1 | * | 12/2004 | O'Shaughnessy .. C03C 17/2453 428/432 |
| 7,632,571 | B2 | * | 12/2009 | Hartig .................... C03C 17/36 428/432 |
| 2002/0102352 | A1 | * | 8/2002 | Hartig .................... C03C 17/36 427/165 |
| 2004/0009356 | A1 |  | 1/2004 | Medwick et al. |
| 2006/0029754 | A1 |  | 2/2006 | Medwick et al. |
| 2007/0116965 | A1 |  | 5/2007 | Medwick et al. |
| 2007/0116967 | A1 |  | 5/2007 | Medwick et al. |
| 2011/0236715 | A1 |  | 9/2011 | Polcyn et al. |
| 2011/0268941 | A1 |  | 11/2011 | Fischer et al. |
| 2013/0057951 | A1 |  | 3/2013 | Hevesi et al. |

FOREIGN PATENT DOCUMENTS

| FR | 2 936 510    | 4/2010  |
| WO | 00 76930     | 12/2000 |
| WO | 03 093188    | 11/2003 |
| WO | 2011 147864  | 12/2011 |

OTHER PUBLICATIONS

International Search Report issued Dec. 15, 2014 in PCT/EP2014/061113 filed May 28, 2014.

\* cited by examiner

*Primary Examiner* — Lauren R Colgan
(74) *Attorney, Agent, or Firm* — Oblon, McClelland, Maier & Neustadt, L.L.P.

(57) ABSTRACT

The invention relates to low-emissivity and anti-solar glazing systems that change only very little in properties when they are subjected to a heat treatment. They comprise a stack of thin layers comprising an alternating arrangement of n infrared radiation reflecting functional layers and n+1 dielectric coatings, characterized in that: (i) the first dielectric coating comprises a layer made from an oxide in contact with the substrate, (ii) the portion of the coating stack between two functional layers comprises, in order: a barrier layer, a zinc oxide-based layer, a layer of zinc-tin mixed oxide, a nucleation layer, and (iii) the last dielectric coating comprises a layer made from an oxide other than silicon oxide with a thickness greater than 3 nm overlaid with a layer made from a silicon nitride or a silicon oxide with a thickness greater than 10 nm superposed thereon.

17 Claims, No Drawings

LOW-EMISSIVITY AND ANTI-SOLAR GLAZING

The present invention relates to glazing systems that simultaneously have low-emissivity and anti-solar properties and can be incorporated into windows of buildings or used in the field of automotive glazing.

Such glazing systems are commonly formed from a transparent substrate of the type: glass sheet covered with a system of thin layers comprising at least two functional layers based on an infrared radiation reflecting material and at least three dielectric coatings, wherein each functional layer is surrounded by dielectric coatings. The functional layers are generally layers of silver with a thickness of some nanometers. With respect to the dielectric layers, they are transparent and traditionally made from metal oxides and/or nitrides. These different layers are deposited, for example, by means of vacuum deposition techniques such as magnetic field-assisted cathodic sputtering, more commonly referred to as "magnetron sputtering".

These glazing systems have anti-solar properties that may reduce the risk of excessive overheating, for example, in an enclosed space with large glazed surfaces and thus reduce the power load to be taken into account for air-conditioning in summer. In this case the glazing must allow the least possible amount of total solar energy radiation to pass through, i.e. it must have the lowest possible solar factor (SF or g). However, it is highly desirable that it guarantees a certain level of light transmission (LT) in order to provide a sufficient level of illumination inside the building. These somewhat conflicting requirements express the wish to obtain a glazing unit with a high selectivity (S) defined by the ratio of light transmission to solar factor. These glazing systems also have a low emissivity, which allows a reduction in the heat loss through high wavelength infrared radiation. Thus, they improve the thermal insulation of large glazed surfaces and reduce energy losses and heating costs in cold periods.

These glazing systems are generally assembled as multiple glazing units such as double or triple glazing units or even as laminated glazing units, in which the glass sheet bearing the laminated unit is combined with one or more other glass sheets with or without coating, with the low-emissivity multilayer stack being in contact with the internal space between the glass sheets in the case of multiple glazing units, or in contact with the interlayer adhesive of the laminated unit in the case of laminated glazing units.

In some cases an operation to mechanically reinforce the glazing, such as thermal toughening of the glass sheet or sheets, becomes necessary to improve the resistance to mechanical stresses. For particular applications, it may also become necessary to give the glass sheets a more or less complex curvature by means of a bending operation at high temperature. In the processes of production and shaping of glazing systems there are certain advantages to conducting these heat treatment operations on the already coated substrate instead of coating an already treated substrate. These operations are conducted at a relatively high temperature, which is the temperature at which the functional layer based on infrared reflective material, e.g. based on silver, tends to deteriorate and lose its optical properties and properties relating to infrared radiation. These heat treatments consist in particular of heating the glass sheet to a temperature higher than 560° C. in air, e.g. between 560° C. and 700° C., and in particular around 640° C. to 670° C., for a period of about 3, 4, 6, 8, 10, 12 or even 15 minutes, depending on the type of treatment and the thickness of the sheet. In the case of a bending treatment, the glass sheet may then be bent to the desired shape. The toughening treatment then consists of abruptly cooling the surface of the flat or bent glass sheet by air jets or cooling fluid to obtain a mechanical reinforcement of the sheet.

Therefore, in the case where the coated glass sheet must undergo a heat treatment, quite specific precautions must be taken to form a coating structure that is able to withstand a thermal toughening and/or bending treatment, sometimes referred to hereafter by the term "temperable", without losing the optical and/or energy properties it has been created for. In particular, the dielectric materials used to form the dielectric coatings must withstand the high temperatures of the heat treatment without exhibiting any adverse structural modification. Examples of materials particularly suitable for this use are zinc-tin mixed oxide, silicon nitride and aluminium nitride. It is also necessary to ensure that the functional layers, e.g. silver-based layers, are not oxidised during the course of the treatment, e.g. by assuring that at the instant of treatment there are barrier layers that are capable of either oxidising in place of the silver by trapping free oxygen or blocking the free oxygen migrating towards the silver during the heat treatment.

In addition, the formation of these layer assemblies must also result in satisfactory colours both in reflection and transmission with demand tending towards the most complete neutrality possible. The difficulty is to combine the colorimetric requirements with those associated with "base" conditions: high light transmission, very low emissivity, ability to withstand heat treatment, all at the same time.

Another requirement that must be increasingly taken into account results from the fact that products that have not been heat treated and others that have been heat treated must sometimes be combined with one another for the same application, e.g. within the same building facade. Consequently, it was previously necessary to develop and produce two types of stacks of low-emissivity layers in parallel, one for non-toughened glazing units and the other for glazing units intended to be toughened or bent, and this is complicated both in terms of research and development and in production stock management in particular. Since then, so-called "self-matchable" coating stacks have been developed that change very little in their properties, in particular their optical and energy properties, for the case where the substrate is subjected to a toughening or bending type of heat treatment.

Moreover, while the principles ruling the optical properties of materials forming the layers are well known, an additional difficulty lies in the production methods of these glazing units. The deposition conditions and in particular the deposition rate are dependent on the nature of the materials considered. The deposition rate must be sufficient for economically acceptable industrial production. It depends on multiple factors that guarantee stability of function over time and over the whole surface of the sheet and the absence of defects in the layer.

Several solutions have bee proposed to meet these diverse requirements, but no solution has provided a really satisfactory glazing unit that will allow us to comply with the requirements of these new demands.

EP 1 140 721 describes coating stacks of silver-based layers of the type glass/dielectric I/Ag I/AZO/dielectric II/Ag II/AZO/dielectric III, in which each dielectric consists of a lower layer of zinc-tin mixed oxide and an upper layer of zinc oxide. EP 1 140 721 gives us to understand that the coating stacks that it describes can be heat treated and that they only exhibit slight variations in their optical properties after heat treatment. However, it has been shown that after heat treatment a haze and unacceptable spots appeared on layers of this type, and that the electrical resistance per square was increased, itself giving a higher and therefore less favourable emissivity. Moreover coating stacks of this type have exhibited alterations in the layer when subjected to the automatic wet rub test ("AWRT") (see our comparative example 1 described below).

Document WO03/010105 describes coating stacks with double silver layer, the specificity of which is to include a Ti layer under the silver layers. All the proposed stacks begin with a nitride layer on the glass. They are presented as capable of being heat treated while retaining the thermal performance levels of the coating stacks minimising optical modifications thereof and minimising the appearance of optical defects. However, proposed stacks have a not inconsiderable fault: the chemical stability of these products before heat treatment is not sufficient. Hence, since these layers must be able to be used without subsequent heat treatment or else stored and possibly transported sometimes long before undergoing a heat treatment, their ageing resistance before heat treatment must be adequate.

Thus, the aim of the invention is to seek to develop a new type of stack of thin low-emissivity and anti-solar layers that is effective in terms of optical and energy properties and that retains these performance levels if then subjected to a toughening or bending type of heat treatment or not.

The following information is used in the present invention:

light transmission (LT) is the percentage of incident light flux, illuminant D65/2°, transmitted by the glazing.

light reflection (LR) is the percentage of incident light flux, illuminant D65/2°, reflected by the glazing. It may be measured from the layer side (LRc) or the substrate side (LRg).

energy transmission (ET) is the percentage of incident energy radiation transmitted by the glazing calculated in accordance with standard EN410.

energy reflection (ER) is the percentage of incident energy radiation reflected by the glazing calculated in accordance with standard EN410. It may be measured on the external side of the building or vehicle (ERext) or the internal side of the building or vehicle (ERint).

solar factor (SF or g) is the percentage of incident energy radiation that is directly transmitted by the glazing, on the one hand, and absorbed by this, then radiated in the opposite direction to the energy source in relation to the glazing. It is here calculated in accordance with standard EN410.

the U value (coefficient k) and emissivity (s) are calculated in accordance with standards EN673 and ISO 10292.

the CIELAB 1976 values (L*a*b*) are used to define the tints. They are measured with illuminant D65/10°.

$\Delta E^* = \sqrt{(\Delta L^*)^2 + (\Delta a^*)^2 + (\Delta b^*)^2}$ represents the tint variation during the heat treatment, i.e. the difference between before and after heat treatment colours.

the resistance per square ($R^2$) ("sheet resistance"), expressed in ohms per square ($\Omega/\square$), measures the electrical resistance of thin films.

When values are referred to as "in the range of between a and b", they may be equal to a or b.

The positioning of the stack of layers in a multiple glazing structure is given according to the classic sequential numbering of the faces of a glazing unit, face 1 being on the exterior of the building or vehicle and face 4 (in the case of a double glazing unit) or face 6 (in the case of a triple glazing unit) on the interior.

When referring to silicon nitride or silicon oxide layers herein, it should be understood that the layers may also incorporate a small quantity of aluminium, as is well-known in the art of magnetron sputtered coatings. Such aluminium is included as doping agent, generally in a quantity of 10 Wt. % at most.

For the sake of clarity, when using terms like "below", "above", "lower", "upper", "first" or "last" herein, it is always in the context of a sequence of layers starting from the glass below, going upward, further away from the glass. Such sequences may comprise additional intermediate layers, in between the defined layers, except when a direct contact is specified.

The present invention relates to a glazing unit according to claim 1 and the dependent claims present preferred embodiments.

The invention concerns a glazing unit comprising a transparent substrate provided with a stack of thin layers comprising an alternating arrangement of n infrared radiation reflecting functional layers and n+1 dielectric coatings, with n>1, such that each functional layer is surrounded by dielectric coatings. Indeed, the present invention relates solely to coating stacks comprising at least two infrared radiation reflecting functional layers. The glazing according to the invention is characterised in that:

(i) the first dielectric coating closest to the substrate comprises a layer made from an oxide, in direct contact with the substrate, (ii) the portion or portions of the coating stack located between two functional layers comprise, in order starting from the substrate:
  a. a barrier layer, in direct contact with an underlying functional layer, made from a zinc oxide possibly doped with aluminium in a weight ratio of Zn/Al of at least 90/10,
  b. a layer of zinc oxide or a zinc oxide-based layer comprising another metal in a weight ratio of Zn/metal of at least 80/20 that has a different composition from layer (ii)a,
  c. a layer of zinc-tin mixed oxide with a different composition from layer (ii)b,
  d. a zinc oxide-based nucleation layer, directly below and in contact with the overlying functional layer, with a different composition from layer (ii)c, and (iii) the last dielectric coating furthest away from the substrate comprises, in order starting from the substrate, a layer made from an oxide other than silicon oxide with a thickness greater than 3 nm and a layer made from a silicon nitride or a silicon oxide with a thickness greater than 10 nm.

Because of the particular selection of layers of the coating stack and primarily because of the combination of the presence of a layer made from an oxide in direct contact with the substrate, the sequence "barrier layer/ZnO/zinc-tin mixed oxide/nucleation layer" as defined in claim 1 between two functional layers, and of an adequate layer of silicon nitride or silicon oxide in the last dielectric coating, such glazing units may thus provide the following advantages (coating on a standard 6 mm thick clear soda-lime float glass sheet incorporated into a double glazing unit with another standard 4 mm thick clear soda-lime float glass sheet, space between glass sheets of 15 mm filled to 90% with argon, stack of layers in position 2):

a high light transmission (LT≥68%) at the same time as a low emissivity (s 0.038, preferably ∈≤0.025) to limit heat losses;

a low solar factor (SF<41%) to enable reduction of the risk of excess overheating as a result of sunshine;

a high selectivity (LT/SF≥1.75);

an insulating property enabling a value U≤1.1 W/(m²K), preferably U≤1.0 W/(m²K) to be reached;

a neutrality of tint in transmission and in reflection, whether in a single glazing or multiple glazing, with preferred values in single glazing:

| in transmission: | 88 ≤ L* ≤ 94 | −6 ≤ a* ≤ +4 | −4 ≤ b* ≤ +4 |
| in reflection substrate side: | 25 ≤ L* ≤ 40 | −4 ≤ a* ≤ +3 | −16 ≤ b* ≤ 0 | the possibility of being heat treated, the coating being resistant to high temperatures, or of being used without heat treatment;

an aesthetic appearance without flaw, with an extremely limited or even non-existent haze without or after heat treatment, and the absence of unacceptable spots after heat treatment;

the retention of optical and energy properties virtually unchanged after heat treatment allowing the use of products that have been heat treated or not one beside the other ("self-matchability"): no or little change in colour in transmission and in reflection (ΔE*≤8, preferably ≤5, more preferably ≤2) and/or no or little change in light transmission and reflection and energy values (Δ=|(value before heat treatment)−(value after heat treatment)|≤5, preferably ≤3, more preferably ≤1), in single glazing.

an adequate chemical stability for use without heat treatment or for the time interval before heat treatment, and in particular a result of the climatic chamber test or the salt spray test according to standard EN1036-2012 that does not give any defect or any discoloration visible to the naked eye after 1 day, preferably after 3 days.

high-quality mechanical stability, in particular a result of the automatic rub test (AWRT, as explained above) for 500 cycles showing deterioration in the layer and/or disappearance of the layer over less than 25% of the tested zone, preferably over less than 10% of the tested zone.

The inventors have indeed found that not only was it essential to have a layer made from an oxide (and not, as in many known coating stacks, a nitride such as aluminium or silicon nitride) in direct contact with the substrate in particular to assure the chemical stability of the product that has not been heat treated, but also essential to have the sequence "barrier layer/ZnO/zinc-tin mixed oxide/nucleation layer" as defined in claim 1 between two functional layers, in particular to limit the appearance of haze and degradation of the resistance per square after heat treatment; and finally that it was essential to have a layer of silicon nitride or silicon oxide above an oxide layer in the last dielectric coating, in particular for the self-matchability and the absence of defects after heat treatment.

The first dielectric according to the invention comprises a layer made from an oxide, as single layer or as the lowest layer. Advantageously, this layer made from an oxide, which is in direct contact with the substrate, is a layer of an oxide of at least one element selected from Zn, Sn, Ti and Zr. It is preferably a layer of zinc-tin mixed oxide, more preferably a layer of zinc-tin mixed oxide, in which the proportion of zinc-tin is close to 50-50% by weight ($Zn_2SnO_4$), e.g. 52-48 Wt. %. The zinc-tin mixed oxide may be advantageous in that it has a good deposition rate compared, for example, to $SiO_2$ or $Al_2O_3$, and/or in that it has a good stability compared, for example, to pure ZnO or bismuth oxide. Moreover, it may be advantageous in that it has less tendency to generate haze after heat treatment of the stack compared, for example, to the oxides of Ti or Zr. The layer made from an oxide in direct contact with the substrate advantageously has a thickness of at least 15 nm, preferably at least 20 nm. These minimum thickness values allow, inter alia, the chemical stability of the product that has not been heat treated to be assured, as well as assuring the resistance to the heat treatment.

As uppermost layer directly under and in contact with the functional layer, the first dielectric coating may advantageously comprise a zinc oxide-based layer, sometimes referred to as "nucleation" or "wetting" layer, which assists the growth of the silver on top of it and helps increase the resistance per square of the product. This zinc oxide-based layer may consist of zinc oxide or possibly be doped with other metals, e.g. aluminium, in a proportion generally of 10% by weight at most, preferably around 2% by weight. It preferably has a thickness of 15 nm at most, preferably in the range of between 1.5 and 10 nm, more preferably between 3 and 10 nm.

The first dielectric coating preferably has a thickness of at least 15 nm, more preferably at least 20 nm. Its thickness is preferably 55 nm at most, more preferably 50 nm at most.

We have given the term "portion(s) of the coating stack located between two functional layers" to the assembly or assemblies of layers surrounded by two functional layers. In the case of a coating stack with two functional layers, there is a single portion of the coating stack which is located between two functional layers. In the case of a coating stack with three functional layers there are two portions of the coating stack which are located between two functional layers. In the following description when reference is made in general to the portion of the coating stack located between two functional layers, even if not specifically stated, the same considerations apply to the case having several portions of the coating stack located between two functional layers.

The portion of the coating stack located between two functional layers according to the invention starts with a barrier layer (ii)a in direct contact with the underlying functional layer made from a zinc oxide possibly doped with aluminium in a weight ratio of Zn/Al of at least 90/10. More preferably, the barrier layer is a layer of pure ZnO (designated as iZnO) or a layer of zinc oxide doped with aluminium (designated as AZO) in a proportion of 5% by weight at most, preferably of around 2% by weight. These types of barrier have the advantage of improving the "self-matchability" of the product and the resistance per square. The barrier layer preferably has a thickness of 20 nm at most or 18 nm at most, more preferably 16 nm at most, preferably in the range of between 1 and 18 nm or between 2 and 18 nm, more preferably between 3 and 16 nm.

The portion of the coating stack located between two functional layers according to the invention then comprises a layer (ii)b of zinc oxide or a zinc oxide-based layer comprising another metal in a weight ratio of Zn/metal of at least 80/20, preferably at least 90/10. This other metal may, for example, be aluminium or tin; aluminium being generally preferred. This layer (ii)b has a different composition from layer (ii)a: it may thus consist of different materials or of the same materials, but then in a different proportion.

Layer (ii)b preferably has a thickness of at least 4 nm, more preferably at least 5 nm. Its thickness is preferably 30 nm at most or 20 nm at most, more preferably 10 nm at most. The inventors have found that placing a layer (ii)b of this nature and with these thickness ranges between the barrier layer and the rest of the dielectric coating was essential for the mechanical stability of the glazing before heat treatment.

The portion of the coating stack located between two functional layers according to the invention then comprises a layer (ii)c of zinc-tin mixed oxide. This is preferably a layer of zinc-tin mixed oxide in which the proportion of zinc-tin is close to 50-50% by weight ($Zn_2SnO_4$), e.g. 52-48 Wt. %. This layer (ii)c has a different composition from layer (ii)b: it may thus consist of different materials or of the same materials, but then in a different proportion. Layer (ii)c preferably has a thickness of at least 40 nm, more preferably at least 50 nm. Its thickness is preferably 100 nm at most, more preferably 80 nm at most.

The portion of the coating stack located between two functional layers according to the invention then comprises a nucleation layer (ii)d of zinc-tin mixed oxide directly under and in contact with the overlying functional layer. This layer, which assists the growth of the silver on top of it and helps to improve the resistance per square of the product, is sometimes referred to as a "wetting" layer. This zinc oxide-based layer may consist of zinc oxide or possibly be doped with other metals, e.g. aluminium, in a proportion generally of 10% by weight at most, preferably of around 2% by weight. This layer (ii)d has a different composition from layer (ii)c: it may thus consist of different materials or of the same materials, but then in a different proportion. It preferably has a thickness of 15 nm at most, preferably in the range of between 1.5 and 10 nm, more preferably between 3 and 10 nm.

The portion of the coating stack located between two functional layers according to the invention preferably has a thickness of least 45 nm or at least 50 nm, more preferably at least 60 nm. Its thickness is preferably 150 nm at most or 130 nm at most, more preferably 120 nm at most.

The last dielectric coating according to the invention furthest away from the substrate comprises, in order starting from the substrate: a layer made from an oxide other than silicon oxide with a thickness greater than 3 nm and a layer made from a silicon nitride or a silicon oxide with a thickness greater than 10 nm.

The layer of the last dielectric coating made from an oxide other than silicon oxide with a thickness greater than 3 nm is preferably a layer of oxide of at least one element selected from Zn, Sn, Ti and Zr. It is preferably a layer of zinc-tin mixed oxide, more preferably a layer of zinc-tin mixed oxide, in which the proportion of zinc-tin is close to 50-50% by weight ($Zn_2SnO_4$). It preferably has a thickness of at least 4 nm, more preferably at least 5 nm or at least 6 nm. Its thickness is preferably 25 nm at most or 20 nm at most, more preferably 18 nm at most or 15 nm at most.

Above this oxide layer of the last dielectric coating, but not necessarily in direct contact with it, is the layer made from a silicon nitride or a silicon oxide with a thickness greater than 10 nm. It preferably has a thickness of at least 12 nm or at least 14 nm, more preferably at least 15 nm or at least 16 nm. Its thickness is preferably 40 nm at most or 35 nm at most, more preferably 30 nm at most or 25 nm at most. Silicon nitride is generally preferred to silicon oxide, since it may be easier to deposit industrially by magnetron sputtering and because it may provide in the last dielectric a better mechanical stability and a better resistance to heat treatment than a silicon oxide. This silicon nitride layer may be the last layer of the coating stack. Alternatively, this layer could rather be a layer of aluminium oxide or aluminium nitride, however this solution was not preferred mainly for coating durability reasons.

Advantageously, the last dielectric coating may comprise a protective topcoat forming the last layer of the protective surface layer. This preferably consists of an oxide or substoichiometric oxide of at least one element selected from Ti and Zr, more preferably of a titanium-zirconium mixed oxide, e.g. in a weight ratio of Ti/Zr of close to 65/35. Such a layer may improve the chemical and/or mechanical stability of the glazing. This protective topcoat preferably has a thickness of at least 3 nm, preferably at least 5 nm. Its thickness is preferably 15 nm at most or 12 nm at most, more preferably 10 nm at most or 8 nm at most.

The last dielectric coating preferably has a thickness of at least 10 nm or at least 15 nm, more preferably at least 20 nm or at least 22 nm. Its thickness is preferably 80 nm at most or 60 nm at most, more preferably 50 nm at most or 48 nm at most.

The dielectric coatings, and therefore also that of the portion of the coating stack located between two functional layers, may additionally comprise one or more other dielectric layers, should the direct contacts between layers described above as essential be respected: for example, one or more layers of dielectric material made from metal oxide, nitride or oxynitride, preferably ZnO, $TiO_2$, $SnO_2$, $Si_3N_4$, $ZrO_2$, zinc-tin mixed oxide or titanium-zirconium mixed oxide. In the case of a zinc-tin mixed oxide, this may have a zinc-tin proportion close to 50-50% by weight or a zinc-tin proportion close to 90-10% by weight.

Advantageously, the dielectric coating of a portion of the coating stack located between two functional layers may comprise a dielectric material with a refractive index higher than 2.2. This type of material may indeed enable the selectivity of the glazing to be increased. It is preferably an oxide of at least one element selected from Ti, Nb and Zr, more preferably titanium-zirconium mixed oxide, e.g. in a weight ratio of Ti/Zr of close to 65/35.

The infrared radiation reflecting functional layers are preferably silver-based layers that may consist of silver or possibly be doped with palladium or gold, for example, in a proportion of 5% by weight at most, preferably of around 1% by weight. The incorporation of a small quantity of doping agent in the silver-based layer may improve the chemical stability of the stack. The functional layers advantageously have a thickness of at least 6 nm or at least 8 nm, preferably at least 9 nm. Their thickness is preferably 22 nm at most or 20 nm at most, more preferably 18 nm. These thickness ranges may enable the desired low emissivity and anti-solar function to be achieved while retaining a good light transmission. In a coating stack with two functional layers it may be preferred that the thickness of the second functional layer, that furthest away from the substrate, is slightly greater than that of the first to obtain a better selectivity. In the case of a coating stack with two functional layers, the first functional layer may have a thickness, for example, of between 8 and 18 nm and the second functional layer may have a thickness between 10 and 20 nm.

In some embodiments of the invention the stack may also comprise a barrier layer directly superposed on the last functional layer furthest away from the substrate, i.e. above and in direct contact with said last functional layer. This preferably consists of a zinc oxide possibly doped with aluminium or of an indium oxide possibly doped with tin. More preferably, the barrier layer is a layer of pure ZnO (designated as iZnO) or a layer of zinc doped with aluminium (designated as AZO) in a proportion of 10% by weight at most, preferably of around 2% by weight. These types of barrier have the advantage of improving the "self-matchability" of the product and the resistance per square. The barrier layer preferably has a thickness of 20 nm at most or 18 nm at most, more preferably 16 nm at most, preferably in the range of between 1 and 18 nm or between 2 and 18 nm, more preferably between 3 and 16 nm.

l) a layer of silicon nitride with a thickness in the range of between 10 and 35 nm, and m) optionally, a layer of titanium-zirconium mixed oxide with a thickness in the range of between 3 and 10 nm.

The glazing units according to the invention are preferably used in multiple glazing units, e.g. double or triple glazing units. They may have the following properties:

|  | Single Glazing (SG) | Double Glazing (DG) as defined above |
|---|---|---|
| Coating stack with 2 functional layers | | |
| LT before or after heat treatment | — | 24 68% |
| LRc before or after heat treatment | ≤15% | — |
| LRg before or after heat treatment | ≤15% | — |
| ET before or after heat treatment | <45% | — |
| ΔLT, ΔLRc, ΔLRg, ΔET, ΔERc, ΔERg before/after heat treatment | ≤5, ≤3, ≤1 | — |
| $R^2$ before or after heat treatment | between 1.0 and 3.5 Ω/□ | — |
| g before or after heat treatment | — | ≤41% |
| Δg before/after heat treatment | — | ≤5%, ≤3%, ≤1% |
| Selectivity | | ≥1.75 |
| Colour in transmission     L* | between 88 and 94 | |
| before or after heat treatment     a* | between −6 and 4 | |
|                                    b* | between −4 and +4 | |
| ΔE* in transmission | ≤8, ≤5, ≤2 | ≤8, ≤5, ≤2 |
| Colour in reflection glass side     L* | between 25 and 40 | |
| in SG or external side in DG     a* | between −4 and +3 | |
| before or after heat treatment     b* | between −16 and −0 | |
| ΔE* in reflection (glass or ext.) | ≤8, ≤5, ≤2 | ≤8, ≤5, ≤2 |
| Emissivity | <0.038, <0.025 | |
| Coating stack with 3 functional layers | | |
| LT before or after heat treatment | | between 50% and 65% |
| ΔE* in transmission | ≤8, ≤5 | ≤8, ≤5 |
| ΔE* in reflection (glass or ext.) | ≤8, ≤5 | ≤8, ≤5 |
| Selectivity | | ≥1.9 |

In some embodiments of the invention the stack of thin layers comprises at least or consists of, in order starting from the substrate:

a) a layer of zinc-tin mixed oxide with a thickness in the range of between 20 and 40 nm, b) a layer of zinc oxide, possibly doped, with a thickness in the range of between 3 and 10 nm, c) a first silver-based functional layer with a thickness in the range of between 9 and 17 nm, d) a barrier layer of zinc oxide, possibly doped with aluminium in a weight ratio of Zn/Al of at least 95/5, with a thickness in the range of between 2 and 16 nm, e) a layer of zinc oxide or a zinc oxide-based layer comprising aluminium in a Zn/Al weight ratio of at least 90/10 with a different composition from layer (d), with a thickness in the range of between 4 and 10 nm, f) a layer of zinc-tin mixed oxide with a thickness in the range of between 40 and 100 nm, g) a layer of zinc oxide, possibly doped, with a thickness in the range of between 3 and 10 nm, h) a second silver-based functional layer with a thickness in the range of between 10 and 20 nm, i) a barrier layer of zinc oxide, possibly doped with aluminium, with a thickness in the range of between 2 and 16 nm, j) optionally, a layer of zinc oxide comprising at least 90% by weight of zinc with a thickness in the range of between 4 and 10 nm, k) a layer of zinc-tin mixed oxide with a thickness in the range of between 3 and 20 nm, Particular embodiments of the invention will now be described by way of example with reference to Examples 1 and 2 and comparative example 1.

All thicknesses of the examples and the comparative example are given in Angstroms. All the layers have been deposited using magnetic field-assisted cathodic sputtering under vacuum. When heat treatment took place, this was conducted in the following conditions: curing in a static oven at 670° C. for 9 min. 30 sec.

EXAMPLES 1-2

The stacks of layers in accordance with the invention recorded in Table I were deposited onto a glass sheet and then heat treated. These glazing units showed resistance per square values that have been modified very little by the heat treatment (Δ<0.4). These glazing units have proved to be "temperable" and "self-matchable". The heat treated product before heat treatment has a good chemical and mechanical stability (AWRT 500 cycles: deterioration of the layer over less than 10% of the tested zone).

COMPARATIVE EXAMPLE 1

The stack of layers not in accordance with the invention recorded in Table II was deposited onto a glass sheet and then heat treated. Resistance per square values before ($R^2$=1.93 Ω/□; ∈=0.023) and after ($R^2$=3.50 Ω/□; ∈=0.034) heat treatment showing a value greatly degraded by this treatment: the resistance is increased giving a much higher, and therefore less favourable emissivity. This glazing unit cannot therefore be considered "self-matchable". Moreover, a heavy haze perceptible to the naked eye developed after the heat treatment in this comparative example. Finally, before heat treatment this coating stack shows deterioration of the layer when subjected to the automatic wet rub test "AWRT" for 500 cycles over more than 25% of the tested zone, and therefore exhibits a mechanical stability that is not acceptable. This test is conducted with a circular Teflon head coating with a cotton fabric (ADSOL ref. 40700004) that is moved under a load of 1050 g over the layer. The cotton is kept moist with demineralised water for the entire test. The frequency of oscillations is 60 to 90 per minute.

Comparison between Comparative Example 1 and the examples according to the invention demonstrates:
the advantage of the presence of a layer of ZnO between the AZO barrier and the ZSO5 in the portion of the coating stack located between two functional layers, in particular to improve the mechanical stability of the glazing (better results after the automatic wet rub test, AWRT), and
the advantage of having a layer of silicon nitride above an oxide layer in the last dielectric coating, in particular for self-matchability.

In the following tables:
ZSO5 represents a zinc-tin mixed oxide in which the proportion of zinc-tin is close to 50-50% by weight ($Zn_2Sn_2O_4$)
AZO represents a zinc oxide doped with aluminium in an approximate proportion of 2% by weight
SiN represents a silicon nitride

TABLE I

| | glass | ZSO5 | ZnO | Ag | AZO | ZnO | ZSO5 | ZnO | Ag | AZO | ZnO | ZSO5 | SiN |
|---|---|---|---|---|---|---|---|---|---|---|---|---|---|
| ex. 1 | | 320 | 80 | 120 | 150 | 80 | 655 | 80 | 135 | 150 | 70 | 33 | 170 |
| ex. 2 | | 245 | 80 | 84 | 40 | 50 | 677 | 80 | 117 | 40 | 50 | 72 | 200 |

TABLE II

| | glass | ZSO5 | ZnO | Ag | AZO | ZSO5 | ZnO | Ag | AZO | ZnO | ZSO5 |
|---|---|---|---|---|---|---|---|---|---|---|---|
| comp. ex. 1 | | 239 | 80 | 80.7 | 40 | 677 | 80 | 117 | 40 | 50 | 275 |

The invention claimed is:

1. A glazing, comprising:
a transparent substrate having a stack of thin layers, which comprises:
an alternating arrangement of n infrared radiation reflecting functional layers and n+1 dielectric coatings, with n>1, wherein each functional layer is surrounded by the dielectric coatings, wherein:
a first dielectric coating closest to the substrate comprises a layer made from an oxide and is in direct contact with the substrate,
a portion of a coating stack located between two functional layers comprising, in an order starting from the substrate:
a barrier layer in direct contact with an underlying functional layer made from zinc oxide optionally doped with aluminum in a weight ratio of Zn/Al of at least 90/10,
a layer comprising zinc oxide and aluminum in a weight ratio of Zn/Al of at least 80/20 that has a different composition from the barrier layer,
a layer of zinc-tin mixed oxide with a different composition from the layer comprising zinc oxide,
a zinc oxide-based nucleation layer directly below and in contact with an overlying functional layer with a different composition from the layer of zinc-tin mixed oxide, and
a last dielectric coating furthest away from the substrate comprises, in an order starting from the substrate:
a layer made from an oxide other than silicon oxide and having a thickness of greater than 3 nm, and
a layer made from silicon nitride or silicon oxide and having a thickness of greater than 10 nm.

2. The glazing according to claim 1, wherein the layer made from the oxide and is in direct contact with the substrate is a layer of zinc-tin mixed oxide.

3. The glazing according to claim 1, wherein the layer made from the oxide and is in direct contact with the substrate has a thickness of at least 20 nm.

4. The glazing according to claim 1, wherein the first dielectric coating comprises, directly under and in contact with an overlying functional layer, a zinc oxide-based nucleation layer.

5. The glazing according to claim 4, wherein the zinc oxide-based nucleation layer in the first dielectric coating has a thickness of 15 nm at most.

6. The glazing according to claim 1, wherein the stack of thin layers further comprises a second barrier layer made from zinc oxide optionally doped with aluminum or an indium oxide optionally doped with tin, and the second barrier layer is above and in direct contact with a last underlying functional layer.

7. The glazing according to claim 6, wherein the second barrier layer has a thickness of no greater than 20 nm.

8. The glazing according to claim 1, wherein the barrier layer has a thickness of no greater than 20 nm.

9. The glazing according to claim 1, wherein the layer comprising zinc oxide has a thickness in a range of 4 nm to 30 nm.

10. The glazing according to claim 1, wherein the first layer of zinc-tin mixed oxide has a thickness in a range of 40 nm to 100 nm.

11. The glazing according to claim 1, wherein the last dielectric coating further comprises a protective topcoat forming a last layer of the stack of thin layers, wherein the protective topcoat comprises an oxide that is optionally a substoichiometric oxide of Ti, Zr, or both.

12. The glazing according to claim 11, wherein the protective topcoat has a thickness of no greater than 15 nm.

13. The glazing according to claim 1, wherein the stack of thin layers comprises, in an order starting from the substrate:
(i) the first dielectric coating closest to the substrate, which comprises:

a layer of zinc-tin mixed oxide having a thickness in a range of 20 nm to 40 nm, and a layer of zinc oxide having a thickness in a range of 3 nm to 10 nm, which is optionally doped;

(ii) a first silver-based functional layer having a thickness in a range of 9 nm to 17 nm;

(iii) the portion of the coating stack located between two functional layers, wherein:

the barrier layer of zinc oxide has a thickness in a range of 2 nm to 16 nm and is optionally doped with aluminum in a weight ratio of Zn/Al of at least 95/5, the layer comprising zinc oxide and aluminum has a Zn/Al weight ratio of at least 90/10 with a different composition from the barrier layer, with a thickness in a range of 4 nm to 20 nm, the layer of zinc-tin mixed oxide has a thickness in a range of 40 nm to 100 nm, the zinc oxide-based nucleation layer has a thickness in a range of 3 nm to 10 nm and is optionally doped;

(iv) a second silver-based functional layer having a thickness in a range of 10 nm to 20 nm; and (v) the last dielectric coating furthest away from the substrate, comprising:

a barrier layer of zinc oxide having a thickness in a range of 2 nm to 16 nm, which is optionally doped with aluminum, optionally, a layer of zinc oxide comprising at least 90% by weight of zinc with a thickness in a range of 4 nm to 20 nm, the layer made from an oxide other than silicon oxide is a layer of zinc-tin mixed oxide having a thickness in a range of greater than 3 nm to 20 nm, the layer made from silicon nitride or silicon oxide is a layer of silicon nitride having a thickness in a range of greater than 10 nm to 35 nm, and optionally, a layer of titanium-zirconium mixed oxide having a thickness in a range of 3 nm to 10 nm.

14. The glazing according to claim 1, wherein the dielectric coating comprises a layer of a dielectric material having a refractive index higher than 2.2.

15. The glazing according to claim 14, wherein the dielectric material is an oxide of at least one element selected from the group consisting of Ti, Nb and Zr.

16. The glazing according to claim 1, which shows a variation in color both in transmission and in reflection between a glazing that has not been heat treated and a heat treated glazing, as defined by a $\Delta E^*$ in a single glazing, of no greater than 8.

17. The glazing according to claim 1, which shows a variation in light and energy transmission and reflection values between a glazing that has not been heat treated and a heat treated glazing, in a single glazing, of no greater than 5.

* * * * *